May 13, 1941.  H. W. WAHLQUIST  2,241,832

METHOD AND APPARATUS FOR REDUCING HARMONICS IN POWER SYSTEMS

Filed May 7, 1940  2 Sheets-Sheet 1

INVENTOR
HUGO W. WAHLQUIST
BY Ridsdale Ellis
his ATTORNEY

INVENTOR
HUGO W. WAHLQUIST
BY Ridsdale Ellis
his ATTORNEY

Patented May 13, 1941

2,241,832

UNITED STATES PATENT OFFICE 2,241,832

METHOD AND APPARATUS FOR REDUCING HARMONICS IN POWER SYSTEMS

Hugo W. Wahlquist, Ardsley, N. Y.

Application May 7, 1940, Serial No. 333,713

10 Claims. (Cl. 171—97)

This invention relates to means for simultaneously correcting the power factor in power distribution lines by the use of capacitors and at the same time preventing harmonics from interfering with telephone and like lines and also from creating voltages and/or currents in excess of those for which the capacitors normally used for power-factor correction are normally designed.

Power lines and supply systems vary widely so that troubles arising in one type of line do not arise in another, and so on.

Rural lines are usually long, high-voltage and low-amperage. As a result, they have a relatively high distributed capacitance which is apt to tune with the inductance of the supply transformer at frequencies between 500 and 2000. To meet this difficulty, the shunts described in Patent Number 2,212,963 may be used with excellent results. Urban lines are usually short, low-voltage and high-amperage, i. e. are heavily loaded. Having little distributed line capacitance, overhead urban lines have no resonance below 3000 cycles and usually none within the voice range of frequencies. However, when power factor correction capacitors are added, the conditions are changed and resonance may occur in the voice frequency range.

The difference between supply transformer, line and load characteristics can be best illustrated by typical examples of each type of line, no capacitors being used in either case.

Assume the rural line is 20 miles long with a voltage of 12 kv. fed by a 200 kv.-a. transformer and that the urban line is 5 miles long with a voltage of 4 kv. fed by a 2000 kv.-a. transformer. The reactance (inductive) of a transformer varies directly as the square of the voltage and inversely as its rated kv.-a. capacity. The reactance of the above rural transformer would be around 30 ohms at 60 cycles, while the reactance of the urban transformer would be only about 0.3 ohm at 60 cycles. The capacitive reactances of the line may be taken as around 10,000 and 40,000 ohms at 60 cycles for the above rural and urban lines, respectively.

As a result of the above relationships, it follows that the supply transformer reactance is much more important in rural lines than in urban lines. This is clear from the following table (for unloaded lines) which shows a resonance point for the above rural line around 900 cycles and none for the above urban line within the normal voice range.

RURAL

| Frequency | Transformer inductive reactance | Line capacitive reactance |
|---|---|---|
| 60 | +30 | −10,000 |
| 600 | +300 | −800 |
| 900 | +450 | −480 |
| 1,200 | +600 | −300 |

URBAN

| 60 | +0.3 | −40,000 |
| 600 | +3 | −4,000 |
| 6,000 | +30 | −200 |

To correct the power factor of urban lines, it is customary to place a capacitor across the line adjacent the load or to use a number of capacitors distributed along the line. When such capacitors are used, resonance may take place at much lower frequencies. In this case the inductive element in the resonant circuit is the reactance of the line up to the capacitor, the reactance of the supply transformer being relatively unimportant.

One very important source of harmonics is the generator at the power station. These harmonics, except the third, pass through the primary of the supply transformer of the power line and create a corresponding voltage in its secondary. This source of harmonics is of the constant voltage type. Where the supply transformer is three-phase and connected ΔY, no 180-cycle current is transferred through the transformer from the generator, only the so-called balanced harmonics, such as 300, 420, 660, 780, etc.

A second source of harmonic currents is the harmonic voltage generated in the exciting circuit of the supply transformer. It consists of the odd multiples of the fundamental such as the 3rd, 5th, 7th, etc., harmonics. These voltages act in series with the relatively high exciting impedance of the supply transformer. This source of harmonics is, therefore, of the constant current type. The resulting line currents, which may be amplified by resonance, divide between the supply system and the power distribution line in inverse proportion to the impedance in both directions.

A third source of harmonic currents is the harmonic voltages originating out on the distribution line, such as those generated by load transformers or certain types of loads. This source, particularly in the case of lightly loaded transformers, is also of the constant current type.

The net voltage and current on the distribution line is the sum of these three sources and any one of the three may control a particular harmonic in a specific case. For example, the 3rd harmonic or 180-cycle current will usually arise chiefly in the load transformers.

The question of whether the harmonics are of the constant voltage or constant current type is important with regard to the type of shunt which may be used to reduce them. A shunt tuned to a harmonic of the constant voltage type will take a very high current if it is located near the source of the voltage. On the other hand, if the harmonics are of the constant current type, they can be substantially short-circuited with little increase in current.

Where the line is supplied with power by a ΔY transformer which does not pass 180-cycle current from the generator, resonance in a line-to-neutral shunt at 180 cycles may be desirable, since the 180-cycle current generated by the loads is of the constant current type and by using such a shunt the higher harmonics in both the balanced and the residual circuits are simultaneously reduced.

The presence of a power fractor correction capacitor across the line frequently results in conditions of resonance which may occur at or near one of the harmonic frequencies arising from one or more of the above three sources. I have found that the difficulties arising from such resonance can be avoided by placing in series with the capacitor a reactor having a 60-cycle reactance of 5% of the reactance of the capacitor at the same frequency. The action of such a shunt depends upon the fact that the inductive reactance of the reactor increases with frequency while the capacitive reactance of the capacitor decreases so that, for every reactance ratio at 60 cycles, there is a frequency at which they are equal, i. e. a frequency at which the shunt is resonant. That relationship is clear from the following table:

| 60-cycle reactance of reactor in percent of 60-cycle reactance of capacitor | Resonant frequency of shunt |
| --- | --- |
| 0.5 | 850 |
| 2 | 425 |
| 3 | 347 |
| 4 | 300 |
| 5 | 270 |
| 6 | 245 |
| 7 | 227 |
| 8 | 212 |
| 9 | 200 |
| 10 | 190 |
| 11 | 180 |
| 25 | 120 |

If, therefore, the inductive reactance of the reactor is 5% of the capacitive reactance of the capacitor at 60 cycles, the following results will be obtained:

At 60 cycles—capacitor impedance predominates and corrects the inductive component of the line, transformers, and loads.

At 270 cycles—capacitor and reactor impedances are equal and of opposite sign so that the shunt acts as a substantial short-circuit at this frequency.

Over 270 cycles—the reactor impedance predominates so that, as the line with its supply transformer and loads are inductive, the addition thereto of further inductive impedance can never produce a resonant point.

Various suitable applications of the invention are illustrated diagrammatically, by way of example, in the accompanying drawings, wherein.

Figure 1:
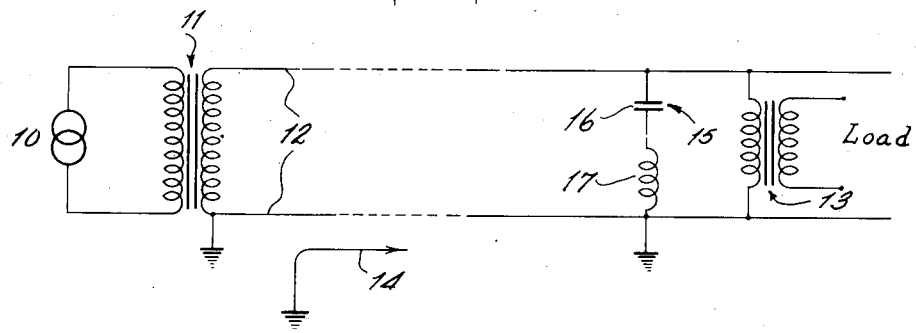
Fig. 1 illustrates the application of the invention to a single-phase power line.

As shown in Fig. 1, a generator 10 supplies current to a transformer 11 which feeds a power line 12 across which are a number of inductive loads, such as that shown supplied through a transformer 13. A paralleling telephone line is indicated diagrammatically by 14. Across the power line near the load 13 a shunt 15 is connected. This shunt comprises a capacitor 16 to correct the power factor. A shunt consisting solely of a capacitor may give rise to harmonic troubles and hence, according to the present invention, the shunt also includes a reactor 17. The size of the capacitor is determined by the amount of power factor correction needed. The inductance of the reactor is determined by the capacitance of the capacitor and is usually such that its reactance at 60 cycles (or other fundamental frequency) is 5% of the reactance of the capacitor at the same frequency.

To fully appreciate the mode of operation of the shunt, it should be borne in mind that the harmonics in a power line are made up of:

(1) Harmonics from the generator 10 flowing outwards through the supply transformer 11 toward the load transformer 13.

(2) Harmonics from the supply transformer 11 flowing outwards toward the load transformer 13.

(3) Harmonics from the load transformer 13 flowing back toward the supply transformer 11.

With a power factor correction capacitor plus a 5% reactor, the resonance which would occur with the capacitor alone is destroyed with respect to currents from all three sources irrespective of the location of the shunt, except perhaps the 3rd harmonic currents. The 3rd harmonic in single-phase lines, if not in excessive volume, does not affect the telephone influence factor (T. I. F.) greatly since the T. I. F. is small at such frequencies. The important point is to prevent resonance at all frequencies above the 3rd, thereby preventing excessive harmonic currents in the line at higher frequencies. It is resonance above the 7th harmonic (420 cycles)

that is especially deleterious. This will be clear from the following table:

| Frequency | T. I. F. |
|---|---|
| 60 | 1 |
| 180 | 15 |
| 300 | 200 |
| 500 | 1,200 |
| 1,000 | 11,100 |
| 1,500 | 4,500 |
| 2,000 | 3,500 |
| 3,000 | 4,000 |
| 5,000 | 500 |

High impedance at frequencies around 1,000 is ensured by the fact that the power factor correction shunt containing a reactor is highly inductive at such frequencies.

Resonance can likewise be destroyed by the use of reactors having over 5% of the reactance of the capacitors at 60 cycles. In fact, it has been proposed to use a 25% reactor to act as a choke for all frequencies. The use of such a reactor has serious disadvantages as compared with a 5% reactor. The 60-cycle voltage across the capacitor is increased slightly more than 5% by a 5% reactor, by over 10% by a 10% reactor, and so on. The voltage rating of capacitors is pretty well standardized for the standard power line voltages. A usual rating is 2.3 kv. Capacitors are designed for about 15% voltage above their name-plate rating. To use a 25% reactor means using the next higher standard voltage capacitor, i. e. 4 kv., at a cost increase of 200%. Also the cost of reactors, in the above-mentioned series, is proportional to their reactance, so that, for the same current rating, a 25% reactor is around four times as expensive as a 5% reactor. Ordinarily, therefore, a 9% reactor is about as large as is desirable to use.

If, on the other hand, the reactor were 4%, instead of 5%, the shunt would tune at 300 cycles. The 300-cycle harmonic originating in the generator and transmitted through the supply transformer is substantially constant voltage and hence with a substantial short-circuit the 300-cycle current might be unduly high, overheating the capacitor and/or reactor and causing other difficulties. These difficulties arise particularly when the shunt is near the supply transformer, in view of the low impedance of the latter. The further the shunt is out on the line, the less important becomes the 300-cycle current. For many installations, however, a range of 4% to 9% may be satisfactory.

Figure 2:
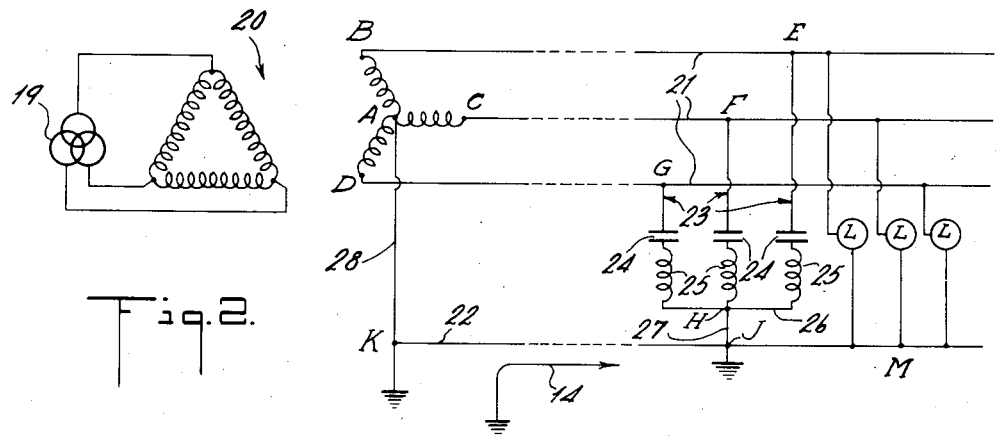
Fig. 2 illustrates one application of the invention to a three-phase, four-wire power line.

A four-wire, three-phase circuit, a modification of the circuit shown in Fig. 1, is shown in Fig. 2.

In this case a generator 19 feeds a power line 21 through a delta-Y transformer 20. The load on the line is indicated diagrammatically by L. Adjacent the load are three shunts 23, each connected at one end to one of the phase wires and at the other end to a common conductor 26, which, in turn, is connected by conductor 27 to the neutral 22. The neutral is connected to the neutral point of the secondary of transformer by conductor 28. Each shunt includes a capacitor 24 and a 5% reactor 25. These 5% reactors eliminate the troubles arising from the unbalancing of the non-triples as well as resonance effects at all harmonic frequencies both non-triple and triple from 300 cycles upwards, including the 300-cycle current. The unbalancing of the non-triples is due to the fact that the resonance frequencies are not the same for all three wires.

Figure 3:
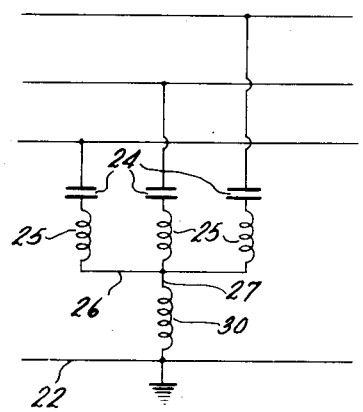
Fig. 3 illustrates another application of the invention to a three-phase, four-wire power line.

This arrangement has the limitation that there may be resonance in the residual circuit at 180 cycles, but this may be overcome by the circuit arrangement shown in Fig. 3, which includes the insertion of a 2% reactor 30 in the connection 27 between the points H and J of Fig. 2. In view of the parallel-series relationship of the 5% and 2% reactors, they behave like a single 11% reactor in the residual circuit. From the table given previously it will be evident that an 11% reactor makes a shunt resonate at 180 cycles, i. e. the shunt acts as a short-circuit for currents of that frequency. While 2% is the ideal reactor size, good results can frequently be obtained with 1½% or even 1% reactors on the one hand, and 3% or even 5% on the other hand. Any division of the reactor ratings between the shunts 23 and the connection 27 which will eliminate the troubles due to 300-cycle current and higher in the balanced or residual circuits and those due to 180-cycle current in the residual circuit may be used. In other words, the formula:

Phase reactor (expressed in per cent) + 3 × neutral reactor (expressed in per cent) = 11 gives satisfactory all-round operation with any value of the reactor percentages within the limits imposed by the formula so long as the phase reactor is 5% or more. If only the residual circuit currents have to be considered, then the phase reactor may be reduced to any value between 5 and zero. The figure of 5% is given because it corresponds to optimum results and, as previously explained, very fair results may be obtained with 4%. Similarly, with a 5% phase reactor, the neutral reactor may vary considerably from the formula figure of 2% upwardly without losing all advantageous results.

The 180-cycle current comes from the load and supply transformers, especially the former. This harmonic source is of the constant current type and hence a substantial short-circuit does not greatly increase the flow from the load transformer back to the shunt, while at the same time it prevents the 180-cycle current flowing back to the supply source. In fact, the flow of such current may be decreased by such a shunt.

As the 2% reactor is not in the line-to-line shunts but only in the line-to-neutral shunt, it does not increase the voltage across the capacitors, as would the insertion of an equivalent additional 6% reactor in the line-to-line shunts to raise the total reactor line-to-line reactance to 11%. At the same time it affords a cheap and simple method for short-circuiting the 180-cycle current.

Figure 4:
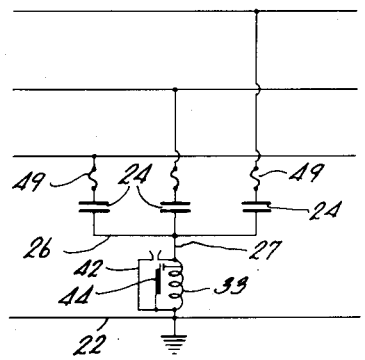
Fig. 4 illustrates a further application of the invention to a three-phase, four-wire power line.

Often a reactor in the connection 27 is sufficient in itself to reduce troubles resulting from the capacitors 24 to a point at which they are not important. Such a circuit is shown in Fig. 4. The reactor 33 should be 3.7%, instead of 2%, so that in view of the parallel series relationship of the capacitors and reactor, the latter can behave like an 11% reactor for currents in the residual circuit. Here again 3.7% is the ideal reactor size, but good results can frequently be obtained where 180-cycle current is not important with 2.5% or even 1.5% reactors on the one hand, especially where the capacitor is remote from the supply point, and 6% or even 8% on the other hand.

In the circuit shown fuses 49 are connected in series with the capacitors on their high voltage side. The blowing of one or two of these fuses or a break in one of the line conductors may cause trouble unless the reactor 33 has an unnecessarily high current rating for normal operation. This may be illustrated by a numerical example. Assume that the bank of capacitors 24 has a rating of 180 kv.-a. (60 kv.-a. per phase) and that the line to line voltage is 4000 or a capacitor voltage of 2300. For such a capacitor bank a neutral reactor having about 3.1 ohms at 60 cycles would be suitable. Under normal conditions the R. M. S. current in the reactor would seldom exceed 10 amperes, and a current rating of 15 amperes should be adequate. However, under conditions with one or two blown capacitor fuses, the neutral reactor would have to carry the phase current of the capacitor which amounts to about 30 amperes for a 180 kv.-a bank. To design for this current the reactor kv.-a. must be increased about 300%, resulting in a corresponding increase in cost. To avoid this increased cost, a thermal element 44 is mounted so as to receive the heat of the reactor. This element is designed so that it will short-circuit the reactor if the temperature should exceed about 80° C. Under these conditions a normal current rating of 15 amperes should be adequate. The details of the thermal element will be described in connection with Fig. 6.

Figure 5:
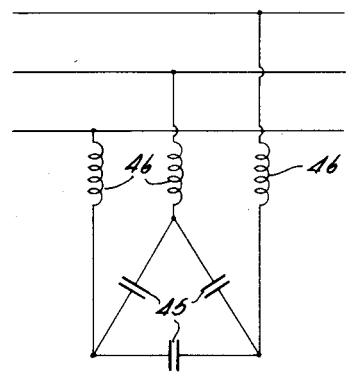
Fig. 5 illustrates an application of the invention suitable for use with a three-phase, three-wire line.

Various other networks including capacitors and reactors may be used for carrying out the invention. One of these alternative forms is shown in Fig. 5 where three capacitors 45 are connected in delta and each corner of the Δ is connected to a phase wire by a reactor 46 having a reactance equal to 5% of the phase-to-neutral reactance of the capacitor bank. With this type of network, resonance in the balanced circuits only is involved, whether or not there is a neutral for the line. This network is especially useful where the line is fed direct from a generator with a grounded neutral which impresses 180 and other triple harmonic voltages on the circuit which do not pass a ΔY transformer.

Figure 6:
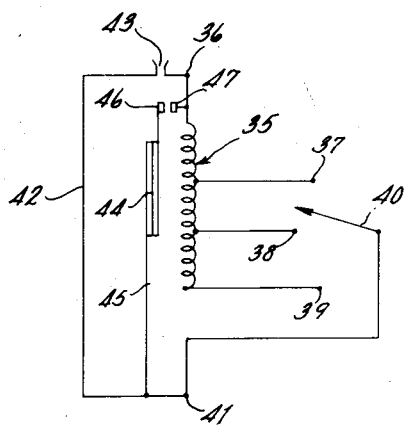
Fig. 6 shows a reactor suitable for use in any one of the applications illustrated in Figs. 2, 3, or 4.

In Fig. 6 is shown a reactor 35 adapted to be used alternatively as a 5%, 3.7% and a 2% reactor with a capacitor of standard size and voltage rating, say 2.3 kv. For this purpose the reactor is provided with four terminals 36, 37, 38, and 39. Terminal 36 is connected to the capacitor. A contact arm or switch 40 engages one or other of the contacts 37, 38, and 39 and connects it to a further terminal 41 by which the reactor is connected to the conductor 26. The taps for terminals 37 and 38 are connected to the coil of the reactor so that 87% of the total turns lie between terminals 36 and 38 and 63% between terminals 36 and 37. Such turn ratios give the desired 5%, 3.7% and 2% relationship. Around the reactor is a conductor 42 having one end connected to the terminal 41 and having its other end separated from the terminal 36 or a part electrically connected thereto by a gap 43. Since the 60-cycle voltage across the reactor is always small, as soon as the lightning discharge has passed there is no power follow-up as there is in the case of a lightning arrestor connected across the line. Accordingly, the gap may be made very small, frequently under $\frac{1}{16}''$ or more usually under $\frac{1}{8}''$.

The reactor 35 may also be short-circuited if it overheats by a thermal element 44 which may be, as shown, a bi-metallic strip electrically connected at its fixed end to the terminal 41 by leads 45 and 42. The free end of the strip carries a contact 46 adapted to engage a contact 47 connected to terminal 36 when the reactor temperature exceeds about 80° C.

I claim:

1. In combination with a three-phase power line having small distributed capacitance and, with the loads thereon, having a lagging power factor, a three-phase shunt system comprising three sets of capacitors and reactors in series to correct power factor without causing resonance, one end of each set being connected to a phase wire, a conductor connecting the other ends of such sets to the other two ends, and a reactor connecting such conductor to the neutral of the power line, the impedance of the first three reactors at the fundamental frequency being around five per cent of the impedance of the capacitors at the same frequency, while the impedance of the fourth reactor is around two per cent of the impedance of the capacitors at the fundamental frequency.

2. A reactor unit for attachment to a power factor correction capacitor installation on a three-phase power line having small distributed capacitance, comprising four reactors, three of which are connected at one end to each other and also to one end of the fourth reactor, the impedances of each of the three reactors being about two and a half times the impedance of the fourth, means for connecting the other ends of the three reactors to the three power factor correction capacitors and means for connecting the other end of the fourth reactor to the neutral of the power line.

3. In combination with a three-phase power line having relatively small distributed capacitance and, with the loads thereon, having a lagging power factor, a three-phase shunt system comprising three sets of capacitors and reactors in series, one end of each set being connected to a phase wire, a conductor connecting the other ends of such sets to the other two ends, and a reactor connecting such conductor to the neutral of the power line, the impedance of the first three reactors at the fundamental frequency being around five per cent of the impedance of the capacitors at the same frequency.

4. A reactor unit for attachment to a power factor correction capacitor installation on a three-phase power line having small distributed capacitance, comprising four reactors, three of which are connected at one end to each other and also to one end of the fourth reactor, the impedances of each of the three reactors being considerably greater than the impedance of the fourth, means for connecting the other ends of the three reactors to the three power factor correction capacitors, and means for connecting the other end of the fourth reactor to the neutral of the power line.

5. In combination with a three-phase power line having small distributed capacitance and, with the loads thereon, having a lagging power factor, a three-phase shunt system comprising three sets of capacitors and reactors in series to correct power factor without causing resonance, one end of each set being connected to a phase wire, a conductor connecting the other ends of such sets to the other two ends, and a reactor connecting such conductor to the neutral of the power line.

6. A reactor unit for attachment to a power factor correction capacitor installation on a three-phase power line having small distributed capacitance, comprising four reactors, three of which are connected at one end to each other and also to one end of the fourth reactor, means for connecting the other ends of the three reactors to the three power factor correction capacitors and means for connecting the other end of the fourth reactor to the neutral of the power line.

7. In combination with a three-phase, four-wire power line having relatively small distributed capacitance and, with the loads thereon, having a lagging power factor, a Y-connected shunt between the phase wires including a connection from the neutral point of the shunt to the neutral wire, such shunt having capacitance to correct the power factor and reactance in series with substantially all of said capacitance to prevent resonance between the shunt capacitance and the line in both the balanced and the residual circuits at all frequencies from 300 upwards, the reactance of the inductive elements of the phase wire to ground network at the fundamental frequency being around 11% of that of the capacitance in each arm of the shunt.

8. In combination with a three-phase power line having relatively small distributed capacitance, a Y-connected shunt including a connection from the neutral point of the shunt to the neutral of the power line, a capacitor in each arm of the shunt and a reactor in said connection having an impedance at the fundamental frequency of not over 8% of that of each of the capacitors.

9. In combination with a three-phase power line having small distributed capacitance, a Y-connected shunt including a connection from the neutral point of the shunt to the neutral of the power line, a capacitor in each arm of the shunt and a reactor in said connection, the reactor having an impedance at the fundamental frequency of around 3.7% of that of each of the capacitors.

10. In combination with a three-phase power line having relatively small distributed capacitance, a Y-connected shunt including a connection from the neutral point of the shunt to the neutral of the power line, a capacitor in each arm of the shunt, a reactor in said connection and a thermostatically-controlled short-circuit around said reactor to prevent undue rise of temperature in said reactor when the system becomes unbalanced.

HUGO W. WAHLQUIST.